United States Patent
Perotti et al.

(10) Patent No.: US 9,985,746 B2
(45) Date of Patent: May 29, 2018

(54) TRANSMITTER AND RECEIVER DEVICES AND METHODS THEREOF

(71) Applicant: HUAWEI TECHNOLOGIES CO., LTD., Shenzhen, Guangdong (CN)

(72) Inventors: Alberto Giuseppe Perotti, Segrate (IT); Branislav M. Popovic, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days. days.

(21) Appl. No.: 15/397,055

(22) Filed: Jan. 3, 2017

(65) Prior Publication Data

US 2017/0117986 A1 Apr. 27, 2017

Related U.S. Application Data

(63) Continuation of application No. PCT/EP2014/064325, filed on Jul. 4, 2014.

(51) Int. Cl.
| | |
|---|---|
| *H04L 5/12* | (2006.01) |
| *H04L 1/00* | (2006.01) |
| *H04W 28/02* | (2009.01) |

(52) U.S. Cl.
CPC .............. *H04L 1/006* (2013.01); *H04L 1/005* (2013.01); *H04L 1/0042* (2013.01); *H04L 1/0071* (2013.01); *H04W 28/0236* (2013.01)

(58) Field of Classification Search
USPC ........ 375/265, 246, 259, 267, 346; 370/209; 725/700, 701
See application file for complete search history.

(56) References Cited

U.S. PATENT DOCUMENTS

2014/0369176 A1* 12/2014 Rudershausen ...... H04B 1/7075
 370/209
2016/0269214 A1* 9/2016 Popovic .................. H04L 1/006

OTHER PUBLICATIONS

International Search Report, dated Mar. 16, 2015, in International Application No. PCT/EP2014/064325 (2 pp.).

(Continued)

*Primary Examiner* — Khai Tran
(74) *Attorney, Agent, or Firm* — Staas & Halsey LLP

(57) ABSTRACT

The present disclosure relates to a transmitter device and a receiver device. The transmitter device comprises a processor which is communicably coupled with a transmitter unit. The processor is configured to receive a set of Z data streams and select K data streams with the same channel quality from the set of Z data streams for transmission, where $K \leq Z$. Thereafter for each information word and for each data stream $k=0, \ldots, K-1$ the processor encodes, scrambles and superposes so as to obtain a first signal $s_U$. Further, for each information word and for each data stream $k=0, \ldots, K-1$ the processor interleaves, encodes, scrambles and superposes so as to obtain a second signal $s_V$. The first signal $s_U$ and the second signal $s_V$ are combined by the processor into a single signal s for transmission. The transmitter unit of the transmitter device is configured to transmit the transmission signal s over a radio channel.

13 Claims, 10 Drawing Sheets

(56) References Cited

OTHER PUBLICATIONS

International Search Report dated Mar. 16, 2015 in corresponding International Patent Application No. PCT/EP2014/064325.
Alberto G Perotti et al.: "Enhanced Trellis Coded Multiple Access (ETCMA)", Jul. 3, 2014, XP55132696.
Katsutoshi Kusume et al.: "IDMA vs. CDMA: Analysis and Comparison of Two Multiple Access Schemes", IEEE Transactions on Wireless Communications, IEEE Service Center, Piscataway, NJ, US , vol. 11, No. 1, Jan. 1, 2012, pp. 78-87, XP011398643.

* cited by examiner

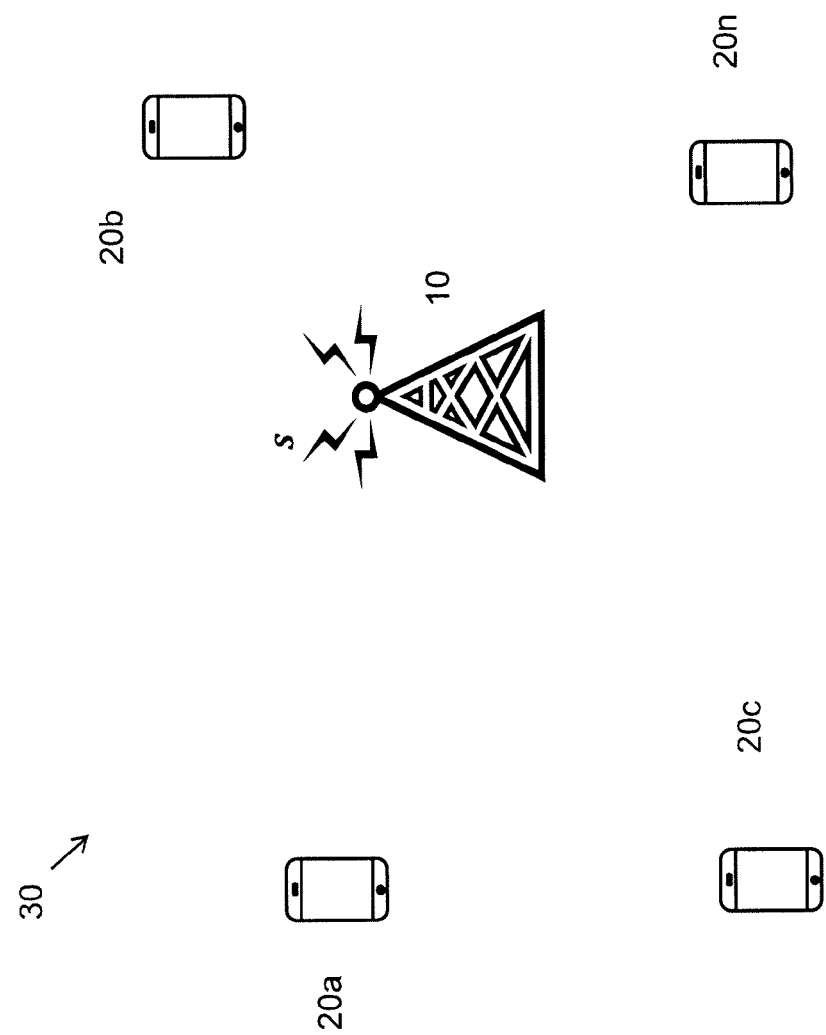

TRANSMITTER AND RECEIVER DEVICES AND METHODS THEREOF

CROSS-REFERENCE TO RELATED APPLICATIONS

This application is a continuation of International Patent Application No. PCT/EP2014/064325, filed on Jul. 4, 2014, the disclosure of which is hereby incorporated by reference in its entirety.

TECHNICAL FIELD

The present disclosure relates to a transmitter device and a receiver device for wireless communication systems. Furthermore, the present disclosure also relates to corresponding methods, a computer program, and a computer program product.

BACKGROUND

Multiple Access (MA) schemes are used to make a shared communications channel simultaneously available to several users or applications that wish to transmit their data streams. Next generation wireless systems will have to face the demand for higher aggregate data rates while being capable of providing reliable communication to many more simultaneous users and applications than current systems. Such high capacity will be achieved by an increasingly efficient use of the channel's physical resources.

Overloading is a paradigm according to which, in a transmission system, several data streams are multiplexed onto the same time-frequency-space Resource Elements (REs), thus resulting in increased data rates and spectral efficiencies. Applying the overloading concept to the MA context, OverLoaded Multiple Access (OLMA) schemes have been conceived which are able to provide significantly higher Spectral Efficiency (SE) than conventional MA schemes.

OLMA schemes can be classified based on the Domain of Separation (DoS) of users/streams:

Power DoS: e.g. Non Orthogonal Multiple Access (NOMA) schemes. Here, a far user and a near user are multiplexed on the same time-frequency-space REs. The scheme is based on the transmission of superposed signals with different amplitudes.

Constellation DoS: e.g., Constellation Expansion Multiple Access (CEMA). Here, subsets of constellation symbols are allocated to different users/streams.

Spreading Sequences DoS: e.g., Low Density Spread (LDS), Code Division Multiple Access (CDMA), and LDS Orthogonal Frequency Division Multiplexing (OFDM). These schemes are based on the allocation of different sparse sequences to different users/streams.

Spread Superposition Codebooks DoS: e.g., LDS-CDMA, LDS-OFDM, Sparse Code Multiple Access (SCMA), Interleave-Division Multiple Access (IDMA). These schemes are based on user-specific spreading and modulation codebooks that aim to maximize the minimum Euclidean distance between the sparse spread signals of different users/streams.

Non-Spread Superposition Codebooks DoS: e.g., Trellis-Coded Multiple Access (TCMA) and Enhanced Trellis-Coded Multiple Access (ETCMA). These schemes are based on TCM with stream-specific interleaving, resulting in stream-specific non-spread codebooks.

Practical NOMA methods can be designed starting from different scenarios, where each scenario is characterized by a specific optimization criterion or target for the selection of transmission parameters, leading to quite different solutions. However, all NOMA transmission methods have to ensure reliable separation/detection, demodulation and decoding of each individual multiplexed stream at the intended UEs.

In the first overloading scenario, the optimization target is the maximization of the aggregate Downlink (DL) spectral efficiency (of one cell) by simultaneous transmission to the UEs experiencing similar physical communication channel qualities. The User Equipments (UEs) that report to the transmitter similar Channel Quality Indicators (CQI) are grouped by the scheduler into the same category, and then served by the same transmission resources when the instantaneous channel conditions are the best at these resources. The corresponding NOMA methods thus preserve the same data rate, the same transmitted energy per bit of each multiplexed stream, and the same scheduler design as if each of the multiplexed streams would have been transmitted alone on observed time-frequency-space resources. It further means that the transmitted power per RE is increased proportionally to the overloading factor, i.e. the number of multiplexed streams. The NOMA schemes designed using this principle include, for example, Low-Density Spread (LDS) Multiple Access (LDSMA), Trellis-Coded Multiple Access (TCMA) and its enhanced version (ETCMA), Constellation-Expansion Multiple Access (CEMA), etc.

In the second overloading scenario, the target is to increase the number of UEs served per RE, but without increasing the transmitted power per RE. The direct consequence of conserving the transmitted power per RE is that the achievable data rates of each of multiplexed UE signals are lower than if each of them would have been transmitted separately. An additional target is to do multiplexing in such a way that the aggregate rate of concurrently served UEs is larger than the aggregate rate that can be obtained by time division multiplexing of these UEs (where each transmission interval is split into subintervals corresponding to different UEs). It can be shown that this target can be achieved only if the received Signal-to-Noise Ratios (SNRs) of the multiplexed UEs are not equal. Indeed, the higher the SNR difference, the higher is the gain one can expect from concurrent transmission. It should be noted that this target is not equivalent to maximizing the aggregate data rate per RE, as it can be shown that the aggregate data rate cannot be larger than the maximum single UE data rate that can be obtained for the UE with the highest received SNR. The practical implementation of such NOMA scheme is based on the weighted amplitude superposition of error-correction code words for (typically two) different UEs, where UE-specific amplitude scaling keeps the total power per RE equal to the RE power for single UE transmission. We shall refer to such scheme as amplitude-weighted NOMA (AW-NOMA). Each amplitude scaling coefficient uniquely determines the maximum code rate for the corresponding UE.

The increased SE of any OLMA scheme is achieved at the expense of increased transmitted power for each multiplexed stream/user. This increase can be characterized by the so-called single-stream SNR loss, a feature that is defined as a function of the aggregate spectral efficiency defined as $$SE(K, SNR) = (1 - BLER(SNR))Rm_0K \text{ [bits/s/Hz]}. \qquad (1)$$

Here, BLER indicates the block error rate, R is the channel code rate, $m_0$ is the modulation order in bits per symbol and K is the overloading factor, i.e. the number of multiplexed streams. The SE is a function of the SNR $$SE_\infty(K) = \lim_{SNR \to \infty} SE(K, SNR) \quad (2)$$

and eq. (2) indicates the asymptotic Aggregate Spectral Efficiency (ASE). The relevant metric for the evaluation of transmission schemes is the single-stream SNR loss $\Delta_{SNR}(K, \rho)$, which is defined as the increase of SNR with respect to the single-stream SNR required by the receiver to achieve a given ratio $\rho$ of the ASE when the overloading factor is K>1, i.e., $$\Delta_{SNR}(K, \rho) = SNR(SE(K, SNR) = \rho SE_\infty(K)) - SNR(SE(1, SNR) = \rho SE_\infty(1)). \quad (3)$$

SUMMARY

An objective of embodiments of the present invention is to provide a solution which mitigates or solves the drawbacks and problems of conventional solutions.

According to a first aspect of the invention, the above mentioned and other objectives are achieved with a transmitter device for a wireless communication system, the transmitter device comprising a processor and a transmitter; wherein the processor is configured to receive a set of Z data streams, wherein each data stream comprises a plurality of information words;

select K data streams from the set of Z data streams for transmission, wherein K≤Z;

for each information word and for each data stream k=0, ..., K-1:

i. encode and modulate an information word $u_k$ of the kth data stream using a Trellis Coded Modulation, TCM, scheme to obtain a first encoded and modulated word $s_k^{(1)}$ for the kth data stream, ii. scramble the first encoded and modulated word $q_k^{(1)}$ using a stream specific scrambling sequence $c_k^{(1)}$ to obtain a first scrambled word $q_k^{(1)}$ for the kth data stream; and iii. superpose the first scrambled words $q_k^{(i)}$ for all K data streams to obtain a first signal $s_U$, i.e.

$$s_U = \sum_{k=1}^{K} q_k^{(1)},$$

further for each information word and for each data stream k=0, ..., K-1:

i. interleave the information word $u_k$ of the k-th data stream using a stream specific permutation $\Pi_k$ to obtain an interleaved word $v_k$, ii. encode and modulate the interleaved word $v_k$ using a second TCM scheme to obtain a second encoded and modulated word $s_k^{(2)}$ for the kth data stream, iii. scramble the second encoded and modulated word $s_k^{(2)}$ for the k-th data stream using a stream specific scrambling sequence $c_k^{(2)}$ to obtain a second scrambled word $q_k^{(2)}$ for the kth data stream; and superpose the second scrambled words for all K data streams to obtain a second signal $s_V$, i.e.

$$s_V = \sum_{k=1}^{K} q_k^{(2)},$$

combine the first signal $s_U$ and the second signal $s_V$ into a signal s for transmission; and wherein the transmitter is configured to transmit the signal s over a radio channel of the wireless communication system.

In a first possible implementation of the transmitter device according to the first aspect, the processor further is configured to select the K data streams experiencing the same channel quality.

The first possible implementation of the transmitter device has the advantage of providing a similar level of error protection to all the selected data streams.

In a second possible implementation of the transmitter device according to the first aspect, all stream specific permutations $\Pi_k$ for the K data streams are all different from each other.

The second possible implementation of the transmitter device makes possible the separation of the different streams.

In a third possible implementation of the transmitter device according to the first aspect, a stream specific permutation $\Pi_k$ for data stream k=0, ..., K-1 has the property that, for each input pair with indices i,j of neighbouring elements, the permutation spread S fulfils:

$$|i-j| < S \Rightarrow |\Pi_{k,i} - \Pi_{k,j}| \geq S \text{ with } \sqrt{N}/10 \leq S \leq \sqrt{N},$$

where |i-j| is the distance between the neighbouring elements i,j; $|\Pi_{k,i} - \Pi_{k,j}|$ is the distance between the neighbouring elements i,j at the output of the stream specific permutation $\Pi_k$; and N is the permutation length.

The third possible implementation of the transmitter device is needed to provide good error correction capabilities to the receiver thereby improving the performance.

In a fourth possible implementation of the transmitter device according to the second or the third implementation of the first aspect, each stream specific permutation $\Pi_k$ is obtained by circularly shifting the same original permutation $\Pi_0$ but with different numbers of elements for each stream specific permutation.

The fourth possible implementation of the transmitter device provides an easy method for generating a set of K suitable interleaver permutations all of them with good permutation spread. Further, the transmitter and receiver systems do not need to store the whole set of permutations: only the original permutation $\Pi_0$ and a set of K integers corresponding to the circular shifts have to be stored, thus saving a significant amount of memory.

In a fifth possible implementation of the transmitter device according to the first aspect, all stream specific scrambling sequences $c_k^{(1)}$ and $c_k^{(2)}$ for the K data streams have the same amplitude and different phase, or different amplitudes and different phases.

The fifth possible implementation of the transmitter device, when the K data streams have the same amplitude and different phase, the average transmitted power is the same for all streams. This is suitable for the overloading scenario where all users experience the same SNR.

The fifth possible implementation of the transmitter device, when the K data streams have different amplitudes and different phases, the average transmitted power of each stream is different. This solution is suitable for the overloading scenario in which different SNR experienced by different users have to be coped with by independently adjusting the power of each stream.

In a sixth possible implementation of the transmitter device according to the first aspect, the processor further is configured to combine the first signal $s_U$ and the second signal $s_V$ to obtain the transmission signal s either by:

mode A—superpose the first signal $s_U$ and the second signal $s_V$; or mode B—orthogonally multiplex the first signal $s_U$ and the second signal $s_V$. The superposing may be $s=s_U+s_V$ and the orthogonally multiplexing may be $s=s_U\|s_V$.

The sixth possible implementation, when mode A is selected, has the advantage of using fewer REs to transmit the transmission signal s, hence resulting in a higher spectral efficiency when the SNR is sufficiently high. The sixth possible implementation, when mode B is selected, has the advantage of providing better performance when the SNR is very low.

In a seventh possible implementation of the transmitter device according to the first aspect, the processor further is configured to superpose or orthogonally multiplex the first signal $s_U$ and the second signal $s_V$ based on channel quality of the radio channel.

The seventh possible implementation of the transmitter device makes it possible to exploit the variation of the radio channel so that mode A is used for higher SNRs and mode B for lower SNRs.

In an eight possible implementation of the transmitter device according to the first aspect, all first TCM schemes and all second TCM schemes for the K data streams are the same TCM scheme.

The eighth possible implementation of the transmitter device thereby provides a low complexity transmitter solution since only one TCM unit is needed in the transmitter.

According to a second aspect of the invention, the above mentioned and other objectives are achieved with a receiver device for a wireless communication system, the receiver device comprising a receiver and a processor; wherein the receiver is configured to receive a signal r over a radio channel of the wireless communication system (30), wherein the signal r includes a transmitted signal s comprising K data streams, wherein each data stream $k=0, \ldots, K-1$ comprises an information word, a first modulated word and a second modulated word, wherein the first modulated word and the second modulated word each has L modulated symbols; and wherein the processor (22) is configured to compute a joint probability distribution for all modulation symbols of the K data streams conditioned to the received signal r;

executing for a first number of iterations $it=0, \ldots, N_{IT1}-1$ and for each data stream $k=0, \ldots, K-1$, if k and it both are even, or if k and it both are odd:

compute first soft information for the L modulation symbols of the first modulated word of the kth data stream, decode the first soft information using a trellis-based decoder $ETCMD_k$ to obtain second soft information for the information word of the kth data stream, feed the second soft information via a stream specific interleaver $\Pi_k$ to a trellis-based decoder $ETCMD_{k+K}$, compute third soft information for the L modulation symbols of the second modulated word of the kth data stream, decode the third soft information using the second soft information and the trellis-based decoder $ETCMD_{k+K}$ to obtain updated soft information for the second modulated word of the kth data stream;

update the joint probability distribution with the updated soft information for the second modulated word of the kth data stream;

else:

compute first soft information for the L modulation symbols of the second modulated word of the kth data stream, decode the first soft information using a trellis-based decoder $ETCMD_{k+K}$ to obtain second soft information for the information word of the kth data stream, feed the second soft information via a stream specific deinterleaver $\Pi_k^{-1}$ to a trellis-based decoder $ETCMD_k$, compute third soft information for the L modulation symbols of the first modulated word of the kth data stream, decode the third soft information using the second soft information and the trellis-based decoder $ETCMD_k$ to obtain updated soft information for the first modulated word of the kth data stream, update the joint probability distribution with the updated soft information for the first modulated word; and executing for a second number of iterations $it=N_{IT2}-1$ and for each data stream $k=0, \ldots, K-1$, compute first soft information for the L modulation symbols of the first modulated word of the kth data stream with the updated joint probability distribution, decode the first soft information using a trellis-based decoder $ETCMD_k$ to obtain second soft information for the information word of the kth data stream, feed the second soft information via a stream specific interleaver $\Pi_k$ to a trellis-based decoder $ETCMD_{k+K}$, compute third soft information for the L modulation symbols of the second modulation word of the kth data stream with the updated joint probability distribution, decode the third soft information using the second soft information and the trellis-based decoder $ETCMD_{k+K}$ to obtain updated soft information for the information word of the kth data stream;

feed the updated soft information via a stream specific deinterleaver $\Pi_k^{-1}$ to the trellis-based decoder $ETCMD_k$ to obtain deinterleaved updated soft information, estimate the information word of the kth data stream with the deinterleaved updated soft information.

In a first possible implementation of the receiver device according to the second aspect, the processor is further configured to select a subset of the K data streams;

estimate the information words associated with the selected subset with the deinterleaved updated soft information.

The first possible implementation of the receiver device according to the second aspect is for delivering to the user or the application that is executing the receiver algorithm only the subset of data streams intended for the user or the application and discarding the other data streams.

According to a third aspect of the invention, the above mentioned and other objectives are achieved by a method in a transmitter device, the method comprising:

receiving a set of Z data streams, wherein each data stream comprises a plurality of information words;

selecting K data streams from the set of Z data streams for transmission, wherein $K \leq Z$;

for each information word and for each data stream $k=0, \ldots, K-1$:

i. encoding and modulating an information word $u_k$ of the kth data stream using a Trellis Coded Modulation, TCM, scheme to obtain a first encoded and modulated word $s_k^{(1)}$ for the kth data stream, ii. scrambling the first encoded and modulated word $s_k^{(1)}$ using a stream specific scrambling sequence $c_k^{(1)}$ to obtain a first scrambled word $q_k^{(1)}$ for the kth data stream; and iii. superposing the first scrambled words $q_k^{(1)}$ for all K data streams to obtain a first signal $s_U$;

further for each information word and for each data stream k=0, . . . , K−1:
i. interleaving the information word $u_k$ of the k-th data stream using a stream specific permutation $\Pi_k$ to obtain an interleaved word $v_k$,
ii. encoding and modulating the interleaved word $v_k$ using a second TCM scheme to obtain a second encoded and modulated word $s_k^{(2)}$ for the kth data stream,
iii. scrambling the second encoded and modulated word $s_k^{(2)}$ for the k-th data stream using a stream specific scrambling sequence $c_k^{(2)}$ to obtain a second scrambled word $q_k^{(2)}$ for the kth data stream; and
superposing the second scrambled words for all K data streams to obtain a second signal $s_V$;
combining the first signal $s_U$ and the second signal $s_V$ into a signal s for transmission;
transmitting the signal s over a radio channel of the wireless communication system.

In a first possible implementation of the method in the transmitter device according to the third aspect, the method further comprises selecting the K data streams experiencing the same channel quality.

In a second possible implementation of the method in the transmitter device according to the third aspect, all stream specific permutations $\Pi_k$ for the K data streams are all different from each other.

In a third possible implementation of the method in the transmitter device according to the third aspect, a stream specific permutation $\Pi_k$ for data stream k=0, . . . , K−1 has the property that, for each input pair with indices i,j of neighbouring elements, the permutation spread S fulfils:

$$|i-j|<S \Rightarrow |\Pi_{k,i}-\Pi_{k,j}|\geq S \text{ with } \sqrt{N}/10\leq S\leq \sqrt{N},$$

where |i−j| is the distance between the neighbouring elements i,j; $|\Pi_{k,i}-\Pi_{k,j}|$ is the distance between the neighbouring elements i,j at the output of the stream specific permutation $\Pi_k$; and N is the permutation length.

In a fourth possible implementation of the method in the transmitter device according to the second or the third implementation of the third aspect, the method further comprises obtaining each stream specific permutation $\Pi_k$ by circularly shifting the same original permutation but with different numbers of elements for each stream specific permutation.

In a fifth possible implementation of the method in the transmitter device according to the third aspect, wherein all stream specific scrambling sequences $c_k^{(1)}$ and $c_k^{(2)}$ for the K data streams have the same amplitude and different phase, or different amplitudes and different phases.

In a sixth possible implementation of the method in the transmitter device according to the third aspect, the method further comprises combining the first signal $s_U$ and the second signal $s_V$ to obtain the transmission signal s either by:
(mode A) superposing the first signal $s_U$ and the second signal $s_V$; or
(mode B) orthogonally multiplexing the first signal $s_U$ and the second signal $s_V$. The superposing may be $s=s_U+s_V$ and the orthogonally multiplexing may be $s=s_U\|s_V$.

In a seventh possible implementation of the method in the transmitter device according to the third aspect, the method further comprises superposing or orthogonally multiplexing the first signal $s_U$ and the second signal $s_V$ based on channel quality of the radio channel.

In an eight possible implementation of the method in the transmitter device according to the third aspect, all first TCM schemes and all second TCM schemes for the K data streams are the same TCM scheme.

According to a fourth aspect of the invention, the above mentioned and other objectives are achieved by a method in a receiver device, the method comprising:
receiving a signal r over a radio channel of the wireless communication system (30), wherein the signal r includes a transmitted signal s comprising K data streams, wherein each data stream k=0, . . . , K−1 comprises an information word, a first modulated word and a second modulated word, wherein the first modulated word and the second modulated word each has L modulated symbols;
computing a joint probability distribution for all modulation symbols of the K data streams conditioned to the received signal r;
executing for a first number of iterations it=0, . . . , $N_{IT1}$−1 and for each data stream k=0, . . . , K−1,
if k and it both are even, or if k and it both are odd:
computing first soft information for the L modulation symbols of the first modulated word of the kth data stream,
decoding the first soft information using a trellis-based decoder $ETCMD_k$ to obtain second soft information for the information word of the kth data stream,
feeding the second soft information via a stream specific interleaver $\Pi_k$ to a trellis-based decoder $ETCMD_{k+K}$,
computing third soft information for the L modulation symbols of the second modulated word of the kth data stream,
decoding the third soft information using the second soft information and the trellis-based decoder $ETCMD_{k+K}$ to obtain updated soft information for the second modulated word of the kth data stream;
updating the joint probability distribution with the updated soft information for the second modulated word of the kth data stream;
else:
computing first soft information for the L modulation symbols of the second modulated word of the kth data stream,
decoding the first soft information using a trellis-based decoder $ETCMD_{k+K}$ to obtain second soft information for the information word of the kth data stream,
feeding the second soft information via a stream specific deinterleaver $\Pi_k^{-1}$ to a trellis-based decoder $ETCMD_k$,
computing third soft information for the L modulation symbols of the first modulated word of the kth data stream,
decoding the third soft information using the second soft information and the trellis-based decoder $ETCMD_k$ to obtain updated soft information for the first modulated word of the kth data stream,
updating the joint probability distribution with the updated soft information for the first modulated word; and
executing for a second number of iterations it=0, . . . , $N_{IT2}$−1 and for each data stream k=0, . . . , K−1,
computing first soft information for the L modulation symbols of the first modulated word of the kth data stream with the updated joint probability distribution,
decoding the first soft information using a trellis-based decoder $ETCMD_k$ to obtain second soft information for the information word of the kth data stream,
feeding the second soft information via a stream specific interleaver $\Pi_k$ to a trellis-based decoder $ETCMD_{k+K}$,
computing third soft information for the L modulation symbols of the second modulation word of the kth data stream with the updated joint probability distribution,
decoding the third soft information using the second soft information and the trellis-based decoder $ETCMD_{k+K}$ to obtain updated soft information for the information word of the kth data stream;

feeding the updated soft information via a stream specific deinterleaver $\Pi_k^{-1}$ to the trellis-based decoder $ETCMD_k$ to obtain deinterleaved updated soft information, estimating the information word of the kth data stream with the deinterleaved updated soft information.

In a first possible implementation of the method in the receiver device according to the fourth aspect, the method further comprises selecting a subset of the K data streams;

estimating the information words associated with the selected subset with the deinterleaved updated soft information.

The advantages of the methods in the transmitter device and in receiver device are the same as those for the corresponding device claims.

It is further noted that the present invention also relates to a wireless communication system comprising at least one transmitter device and at least one receiver device according to the present invention.

Further, a corresponding method in a wireless communication system comprises the method in the transmitter device and the method in the receiver device.

The present invention also relates to a computer program, characterized in code means, which when run by processing means causes said processing means to execute any method according to the present invention. Further, the invention also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Embodiments of the present invention provide improved spectral efficiency compared to conventional solutions. This is especially the case when the block length increases and for lower SNR values. In particular, its aggregate spectral efficiency does not decrease when increasing the block length.

Further applications and advantages of the present invention will be apparent from the following detailed description.

BRIEF DESCRIPTION OF THE DRAWINGS

The appended drawings are intended to clarify and explain different embodiments of the present invention, in which:

FIG. 11 illustrates the invention in a wireless communication system.

DETAILED DESCRIPTION

In a conventional transmitter, multiple independently encoded and modulated TCM data streams are concurrently transmitted. The modulated symbols are interleaved according to a stream-specific permutation and scrambled according to a stream-specific scrambling signature before transmission.

Figure 5:
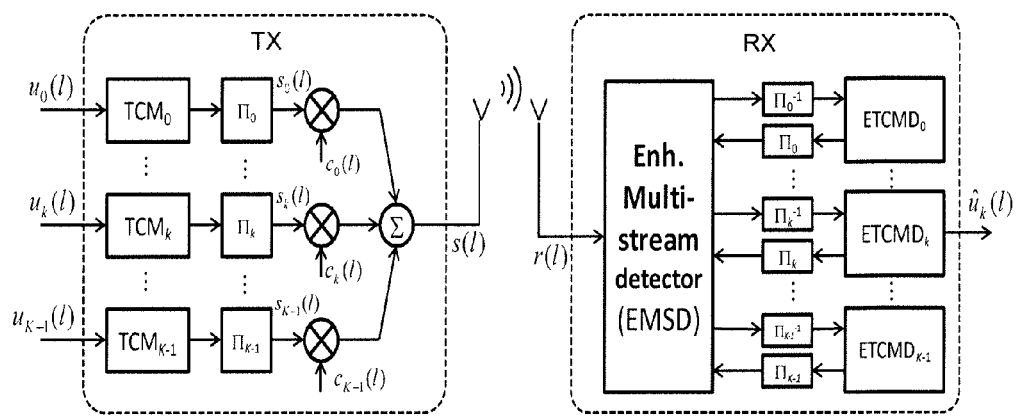
FIG. 5 shows a conventional transmitter solution.

A scheme representing a conventional transmitter solution is shown in FIG. 5, where stream-specific interleavers are indicated with $\Pi_k$ and stream-specific scrambling signatures with $c_k(l)$. In FIG. 5, the transmitter sends multiple data streams to multiple users using the same set of REs for all users. The transmitter receives K number of independent data streams $u_0(l), u_k(l), \ldots, u_{K-1}(l)$. The K number of independent data streams are sent to TCM encoders with indices k, i.e. $TCM_k$. The TCM encoder consists of a rate b/e trellis encoder connected to a modulation mapper that selects the complex output symbol m corresponding to binary label $(d_0, \ldots, d_{e-1})$ from a set of symbols $\chi_{TCM}$ called TCM constellation. Hence, the number of symbols in $\chi_{TCM}$ is $2^e$.

A rate b/e trellis encoder is a device that, at each time instant t, receives in input a vector $(u_0, \ldots, u_{b-1})_t$ of information bits and generates in output a vector $(d_0, \ldots, d_{e-1})_t$ of coded bits. The state of the encoder is represented by binary vector $(s_0, \ldots, s_{g-1})_t$. Its behavior is specified by the following equations $$(s_0, \ldots, s_{g-1})_{t+1} = (s_0, \ldots, s_{g-1})_t A + (u_0, \ldots, u_{b-1})_t B$$

$$(d_0, \ldots, d_{e-1})_t = (s_0, \ldots, s_{g-1})_t C + (u_0, \ldots, u_{b-1})_t D \quad (4)$$

where A is a g×g binary matrix, B is a b×g binary matrix, C is a g×e binary matrix and D is a b×e binary matrix. All operations are performed on the Galois field GF(2).

After trellis-coded modulation to obtain $s_k(l)$ each stream is scrambled with stream specific scrambling sequences $c_k(l)$ and thereafter superposed (summation unit) into a single signal s(l) for transmission in the system.

Further, a corresponding conventional solution receiver has been proposed for the conventional solution transmitter which is also shown in FIG. 5. The receiver for stream k performs iterative multiuser detection and decoding of all streams in order to be able to cancel the interference of the other streams on stream k, then it makes available the recovered information of stream k on its output. The received signal r(l) is processed by the EMSD unit and further by the the interleavers $\Pi_k$, deinterleavers $\Pi_k^{-1}$, and single stream Enhanced TCM Decoders (ETCMD) $ETCMD_k$.

Although featuring a fairly high complexity, such conventional transmitter-receiver exhibits a good performance in a wide range of SNRs for which its SE approaches the capacity of the AWGN channel. Nevertheless, as shown hereinafter, the SE of the conventional solution still exhibits a gap with respect to the AWGN channel capacity for low SNR values and when large blocks or information words are transmitted.

Therefore, the invention herein disclosed relates to a method and a device for the concurrent transmission and reception of multiple independent data streams, possibly intended for different users, by efficiently sharing the same physical time-frequency-space resources. The invention herein disclosed has been developed using a more efficient coded modulation technique than those used in conventional systems, and therefore achieves a higher spectral efficiency. The present invention applies both to the downlink and to the uplink of the wireless communication system. The wireless communication system may operate either in the FDD mode or in the TDD mode.

Figure 1:
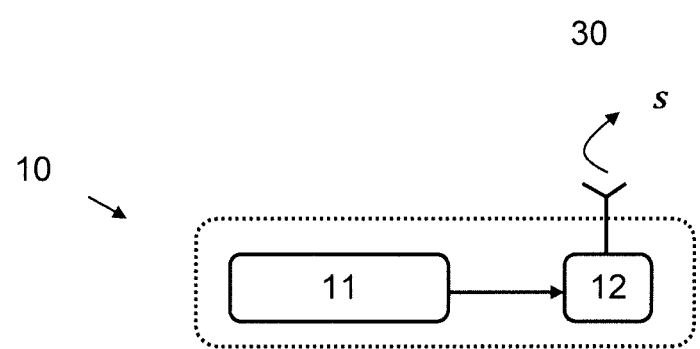
FIG. 1 shows a transmitter device according to the present invention.

FIG. 1 shows a transmitter device 10 according to the present invention. The transmitter device 10 comprises a processor 11 which is communicably coupled with a transmitter unit 12. The processor 11 is configured to receive a set of Z data streams and select K data streams with the same channel quality from the set of Z data streams for transmission, where $K \leq Z$. According to an embodiment of the invention the set of K data streams experience substantially the same channel quality in order to be able to provide the K streams the same link quality. For example, the streams can be selected within SNR intervals, such as 1, 2, 3, 4 dB intervals.

Thereafter for each information word and for each data stream $k=0, \ldots, K-1$ the processor 11 encodes, scrambles and superposes so as to obtain a first signal $s_U$. Further, for each information word and for each data stream $k=0, \ldots, K-1$ the processor 11 interleaves, encodes, scrambles and superposes so as to obtain a second signal $s_V$. The first signal $s_U$ and the second signal $s_V$ are combined by the processor 11 into a single signal s for transmission. The transmitter unit 12 of the transmitter device 10 is configured to transmit the transmission signal s over a radio channel of the wireless communication system 30.

Figure 2:
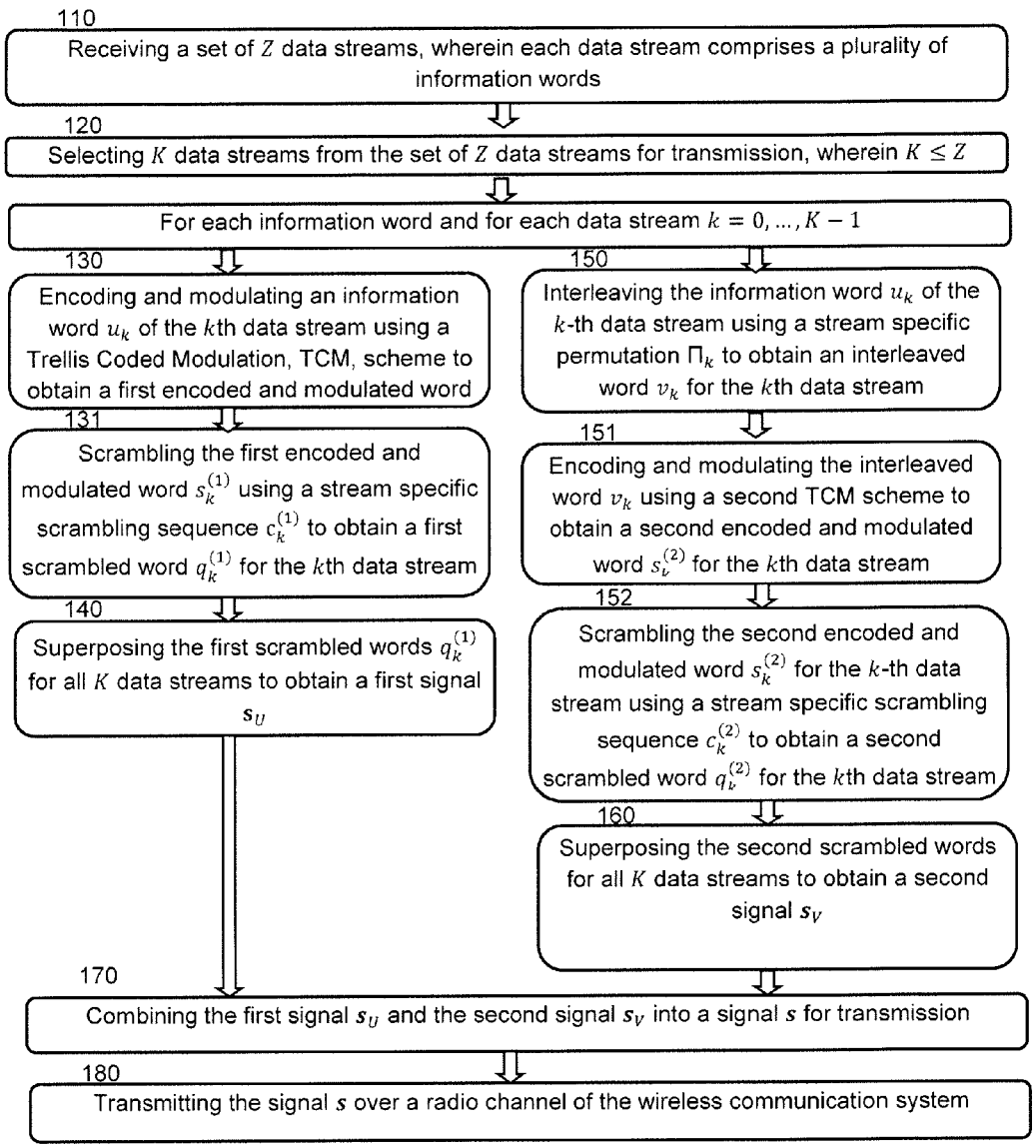
FIG. 2 shows a flow chart of a method in a transmitter device.

FIG. 2 shows a flow chart of a method in transmitter device 10 according to the present invention. The method comprises receiving 110 a set of Z data streams, wherein each data stream comprises a plurality of information words; and selecting K data streams from the set of Z data streams for transmission, wherein $K \leq Z$. Then for each information word and for each data stream $k=0, \ldots, K-1$: encoding and modulating 130 an information word $u_k$ of the kth data stream using a Trellis Coded Modulation, TCM, scheme to obtain a first encoded and modulated word $s_k^{(1)}$ for the kth data stream, scrambling 131 the first encoded and modulated word $s_k^{(1)}$ using a stream specific scrambling sequence $c_k^{(1)}$ to obtain a first scrambled word $q_k^{(1)}$ for the kth data stream; and superposing 140 the first scrambled words $q_k^{(1)}$ for all K data streams to obtain a first signal $s_U$.

Further for each information word and for each data stream $k=0, \ldots, K-1$: interleaving 150 the information word $u_k$ of the k-th data stream using a stream specific permutation $\Pi_k$ to obtain an interleaved word $v_k$, encoding and modulating 151 the interleaved word $v_k$ using a second TCM scheme to obtain a second encoded and modulated word $s_k^{(2)}$ for the kth data stream, scrambling 152 the second encoded and modulated word $s_k^{(2)}$ for the k-th data stream using a stream specific scrambling sequence $c_k^{(2)}$ to obtain a second scrambled word $q_k^{(2)}$ for the kth data stream; and superposing 160 the second scrambled words for all K data streams to obtain a second signal $s_V$.

Finally, combining 170 the first signal $s_U$ and the second signal $s_V$ into a signal s for transmission; and transmitting (180) the signal s over a radio channel of the wireless communication system 30.

Figure 7:
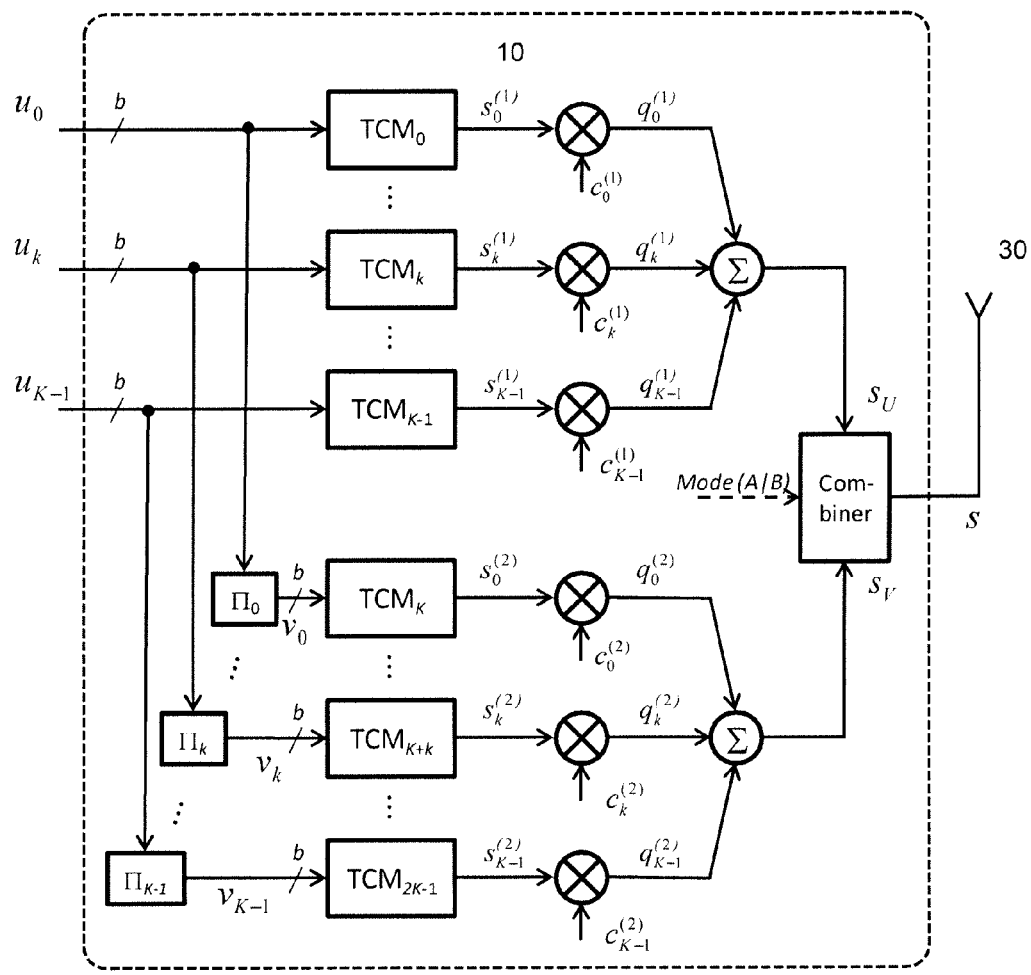
FIG. 7 shows an embodiment of a transmitter according to the present invention.

An embodiment of the present transmitter 10 is shown in FIG. 7 in which solid arrows indicate data signals and dashed arrows indicate control signals. Multiple K data streams are independently encoded and modulated using turbo trellis coded modulation (TCM) then concurrently transmitted. In each Transmission Time Interval (TTI), the transmitter 10 receives as input an information word $u_k$ of size bL bits from each stream $k=0, \ldots, K-1$ and generates in output a signal consisting of L or 2L complex symbols when the combiner is set to operate in transmission mode A or transmission mode B. Such L or 2L complex symbols are transmitted in L REs for mode A and 2L REs for mode B.

Figure 6:
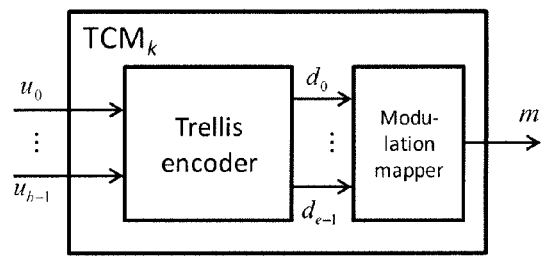
FIG. 6 shows a TCM encoder-modulator.

The information words $u_k$ for each stream are encoded using trellis-coded modulation encoders $TCM_k$ as shown in FIG. 7, and each $TCM_k$ consists of a rate b/e trellis encoder connected to a modulation mapper as shown in FIG. 6. At each time instant, the trellis encoder receives an information symbol of b bits (illustrated with "b" in FIG. 7; this is also show in FIG. 6) and generates a coded symbol $(d_0, \ldots, d_{e-1})$ of e bits. Such coded symbol is then used by the mapper inside each TCM encoder $TCM_k$ (see FIG. 6) to select a corresponding complex symbol from the TCM constellation $\chi_{TCM}$ and send it in output.

Hence, each information word $u_k$ is encoded by TCM encoder $TCM_k$, obtaining a first modulated word $s_k^{(1)}$. Block $TCM_k$ consists of a recursive trellis encoder followed by a modulation mapper. Information word $u_k$ is also interleaved by a stream-specific permutation $\Pi_k$ and encoded by a second and possibly different TCM encoder $TCM_{k+K}$, obtaining a second modulated word $s_{k+K}^{(2)}$. Also the $TCM_{k+K}$ contains a recursive trellis encoder followed by a modulation mapper.

Therefore, a set of K distinct stream specific interleavers, here indicated with $\Pi_k$, is needed in order to help the receiver to separate the streams. These interleavers are the user-unique feature that makes the receiver capable of separating information belonging to different streams and users. Each interleaver reorders the elements of its input block according to a certain permutation indicated with $\Pi_k$.

Permutations for interleaving used in parallel concatenated schemes like the ones used in the present invention have to exhibit certain properties in order to provide good coding gains each pair of neighbouring elements in the input block must be separated by a large distance in the output block. More formally, the permutation spread S is defined as: a permutation $\Pi_k$ of size N has spread S if, for any pair of distinct integers $i,j \in \{0, \ldots, N-1\}$ $$|i-j|<S \Rightarrow |\Pi_{k,i} - \Pi_{k,j}| \geq S. \tag{5}$$

where, i and j are the indices of any two elements in the interleaver input block, $|i-j|$ is their distance, and $|\Pi_{k,i} - \Pi_{k,j}|$ is their distance in the output block. When used to connect recursive trellis encoders in a parallel concatenation permutations characterized by a high S result in a better error correction capability, thus providing higher coding gains.

The problem of finding a good set of permutations all of which have a high S is indeed hard. However, circularly shifting a permutation does not change its spread properties. Therefore, according to an embodiment it is proposed to generate a permutation $\Pi_0$ with good spread properties, called the original permutation, e.g., using the QPP as in the LTE system. Then, the set of stream-specific permutations are generated by circularly shifting the original permutation $\Pi_0$ with different number of elements for different streams, i.e. with different number of shifts to obtain the stream specific interleavers for each stream.

In particular, define $\Pi_k = \Pi_0^{(kQ)}$, where $\Pi_0^{(kQ)}$ indicates a circular shift of kQ positions of permutation $\Pi_0$. Here, Q is a suitably chosen integer. Any choice of Q larger than the constraint length of the trellis encoder yields good results. This solution is particularly convenient since it solves the problem of generating multiple permutations with high S. Moreover, the transmitter and receiver systems do not need to store the whole set of permutations: only $\Pi_0$ and a set of k integers corresponding to the circular shifts have to be stored, thus saving a significant amount of memory.

Furthermore, with reference to FIG. 7, the modulated words $s_k$ and $s_{k+K}$ are scrambled using possibly different scrambling signatures $c_k$ and $c_{k+K}$. Scrambling consists in multiplying the sequence of interleaved modulation symbols $s_k$ by a sequence of complex coefficients $c_k$ as disclosed in FIG. 7.

In one embodiment of the present invention, the complex coefficients of the scrambling sequences have all the same amplitude (e.g. unit amplitude) but different phases. In this case, the average transmitted power is the same for all streams. This solution is suitable for the aforementioned first overloading scenario where all users experience the same SNR.

In one embodiment of the present invention, the complex coefficients of scrambling sequences have different amplitudes and different phases. In this case, the average transmitted power of each stream will be different. This solution is suitable for the aforementioned second overloading scenario, in which the different SNR experienced by different users have to be coped with by independently adjusting the power of each stream.

Scrambled words obtained by modulation of non-interleaved information words are superposed so as to obtaining the first signal $s_U$. Similarly, scrambled words obtained by modulation of interleaved information words are superposed so as to obtaining the second signal $s_V$. Both signals $s_U$ and $s_V$ consist of L complex symbols. Finally, the first $s_U$ and second $s_V$ signals are combined onto a number of time-frequency-space REs and transmitted as a signal s for transmission.

In one embodiment of the present invention the combiner operates according to two different modes, i.e. mode A and mode B:

In mode A; the first signal $s_U$ and the second signal $s_V$ are superposed (added), e.g. in one embodiment as, $$s=s_U+s_V \quad (6)$$

which means that s has L complex symbols.

In mode B; the first signal $s_U$ and the second signal $s_V$ are orthogonally multiplexed onto different REs. In this case, the transmitted signal s is the concatenation of $s_U$ and $s_V$, e.g. in one embodiment as, $$s=s_U\|s_V=(s_{U,0},\ldots,s_{U,L-1},s_{V,0},\ldots,s_{V,L-1}) \quad (7)$$

which means that s has 2L complex symbols.

The two transmission modes A and B use the same total energy to transmit K information words $u_0, \ldots, u_{K-1}$. However, mode B uses twice the REs of mode A and therefore, at high SNR, it achieves half the ASE. The decision to select mode A or mode B is dependent on the channel quality, such as SNR or Signal to Interference and Noise Ratio (SINR). A threshold value SNR* can be added so that for values over the threshold SNR* mode B is selected and mode A for other values. The threshold SNR* can be considered as a design parameter and can depend on employed TCM encoders, number of multiplexed streams, etc.

Figure 3:
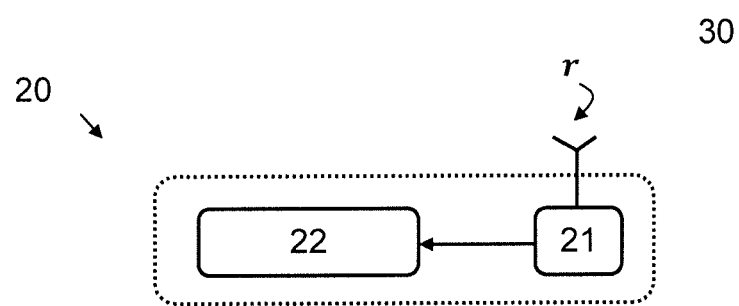
FIG. 3 shows a receiver device according to the present invention.

FIG. 3 shows a receiver device 20 according to the present invention. The receiver device 20 comprises a receiver unit 21 which is communicably coupled with a processor 22. The receiver unit 21 is configured to receive the transmission signal s over the radio channel. The transmission signal s is sent to the processor 22 which is configured to decode and estimate the received transmission signal s in an iterative fashion with two iteration loops.

Figure 4:
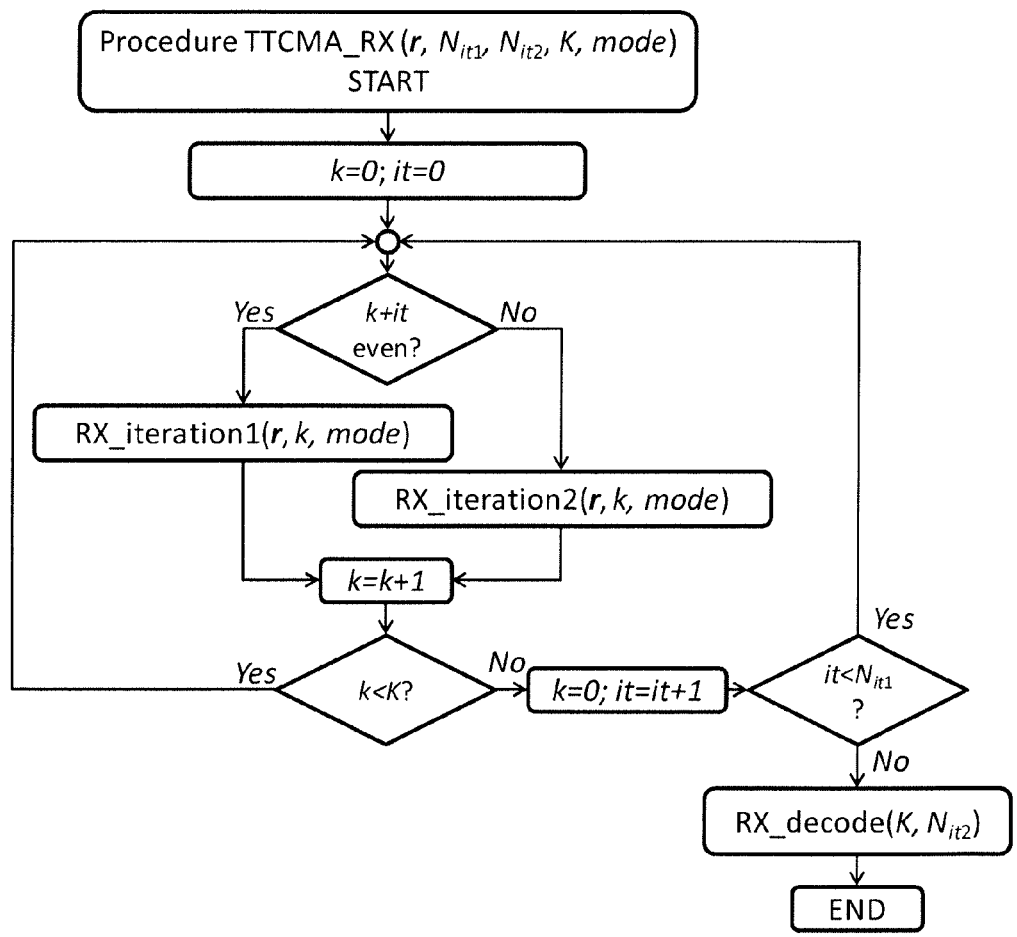
FIG. 4 shows a flow chart of a method in a receiver device.

FIG. 4 shows a flow chart of a method in receiver device 20 according to the present invention. The method comprises of the sequential execution of two number of iterations it. The first number of iterations $N_{IT1}$ alternatively executes functions "RX_iteration1" and "RX_iteration2" dependent on the values for k and it (see below), and is aimed at improving the stream separation performed by the Enhanced Multi Stream Detector (EMSD). The second number of iterations $N_{IT2}$ involves execution of function "RX_decode" and is aimed at delivering reliable estimates of information words to the one or more recipients.

Figure 8:
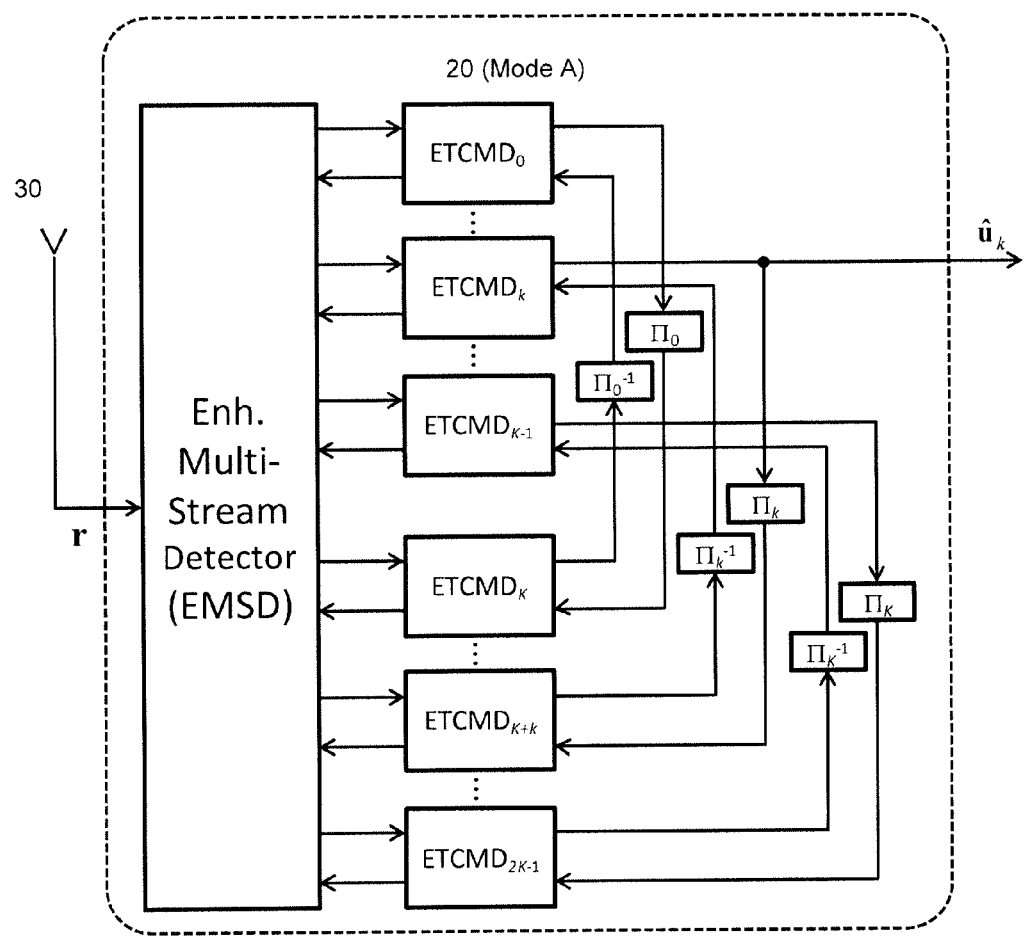
FIG. 8 shows an embodiment of a receiver (mode A) according to the present invention.
Figure 9:
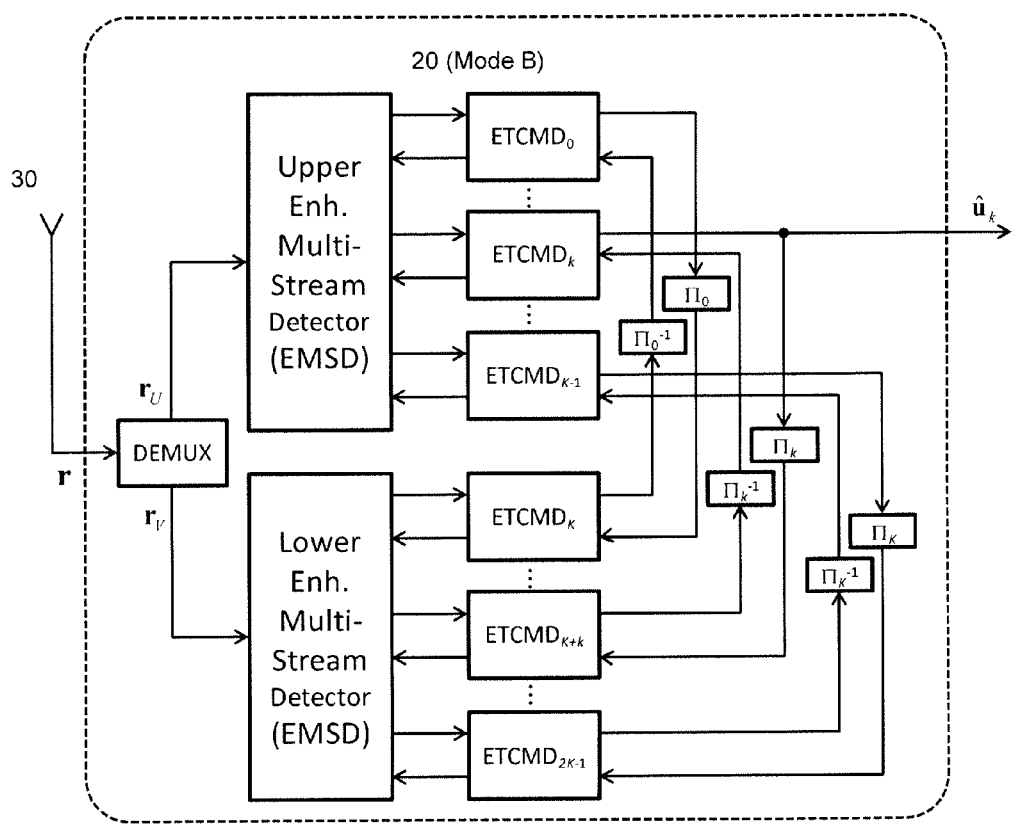
FIG. 9 shows an embodiment of a receiver (mode B) according to the present invention.

The present receiver device 20 hence comprises an EMSD connected to a bank of single-stream Enhanced TCM Decoders (ETCMD), see FIGS. 8 and 9 which shows two embodiments of the present invention. Stream separation is performed by the EMSD with the aid of ETCMDs. Almost ideal stream separation is achieved through the iterative interaction between EMSD and a bank of single-stream ETCMDs according to the present invention.

Interleavers $\Pi_k$ in the receiver 20 perform the same permutation of input data/vector/block as was performed by the corresponding interleavers in the transmitter 10. The only difference is the type of information being interleaved. At the transmitter 10 the interleavers permute information bits; while at the receiver 20 the interleavers perform permutation of soft information values. Deinterleavers, i.e., those that apply the inverse permutations, are indicated with $\Pi_k^{-1}$ in FIGS. 8 and 9.

The following description of the present receiver 20 applies for both mode A and mode B receivers if nothing else is explicitly stated. An embodiment of a mode A receiver is shown in FIG. 8 and an embodiment of a mode B receiver is shown in FIG. 9, respectively.

With reference to FIG. 8 the EMSD computes and iteratively updates the joint probability distribution of the TCM modulation symbols P(s(t)|r) at each time instant t, where s(t) indicates the element of vector s that is transmitted at time t. In other words, the joint probability distribution for all modulation symbols of the K data streams conditioned to the received signal r is computed.

For each stream $k=0, \ldots, K-1$, the EMSD computes the marginal probabilities, i.e. soft information, $\sigma_{k,j}(t)=P(s_k(t)=m_j|r(t))$ that the t-th symbol of signal $s_k$ equals the j-th symbol $m_j$ of the TCM constellation. Then, it sends these probabilities to the encoders for each stream $ETCMD_k$. The encoders $ETCMD_k$ receives as input the soft information $\sigma_{k,j}(t)$, executes a trellis-based decoding algorithm (e.g. Viterbi, BCJR or SISO) that applies the TCM's trellis code constraints and computes updated soft information $\omega_{k,j}(t)$, which is fed back to the EMSD. At the same time, the $ETCMD_k$ computes updated soft information of information symbols $\alpha_{k,n}(t)$ which are sent through the interleaver $\Pi_k$. These soft information become a-priori information a $\beta_{k+K,n}(t)$ as input to encoder $ETCMD_{k+K}$.

The EMSD uses the updated soft information $\omega_{k,j}(t)$ to update the joint probability distributions P(s(t)|r), thus gaining improved knowledge of the transmitted symbol s(t).

When $ETCMD_{k+K}$ is executed it receives as input the marginal distribution $\sigma_{k+K,j}(t)$ from the EMSD and the a-priori soft information of information symbols $\beta_{k+K,n}(t)$ from the interleaver $\Pi_k$. With the marginal distribution $\sigma_{k+K,j}(t)$ and the a-priori soft information the $ETCMD_{k+K}$ computes soft information $\omega_{k+K,j}(t)$ with increased reliability. At the same time, the $ETCMD_{k+K}$ computes updated soft information of information symbols $\alpha_{k+K,n}(t)$ which are sent through the inverse interleaver $\Pi_k^{-1}$. These updated soft information become a-priori information $\beta_{k,n}(t)$ in input to the $ETCMD_k$.

In iterative receiver algorithms, soft information is processed by blocks which produce updated soft information that is sent to other blocks for further processing. In this way, the soft information flows through paths that, after a certain number of iteration steps, form loops. The presence of loops is known to make iterative algorithms less effective in converging to the correct solution. Therefore, the scheduling of blocks' execution and routing of soft information has to be carefully designed in order to avoid forming short loops.

To this purpose, a new scheduling is proposed in order to improve the convergence. The present algorithm performs first $N_{IT1}$ and second $N_{IT2}$ number of iterations, i.e. total of $N_{IT}=N_{IT1}+N_{IT2}$. The first number of $N_{IT1}$ iterations involve the EMSD, the ETCMDs, the interleavers and deinterleavers. The first $N_{IT1}$ iterations are used to allow the EMSD to achieve a good level of stream separation. Therefore, $N_{IT1}$ is set to a value at which further iterations do not improve stream separation. In even iterations when k is even, or during odd iterations when k is odd, deinterleavers are not executed and hence updated soft information of the corresponding information words is not forwarded through them. Similarly, in odd iterations when k is even, or in even iteration when k is odd, interleavers are not executed and hence updated soft information of the corresponding information words is not forwarded through them. In this way, the short loops formed by $ETCMD_k$, $\Pi_k$, $ETCMD_{k+K}$, $\Pi_k^{-1}$ are not present and convergence of the iterative scheme is improved.

After the first number of $N_{IT1}$ iterations has been executed, the receiver 20 achieves a separation between streams that cannot be improved even if the number of first iterations is set to a large value. The soft information $\sigma_{k,j}(t)$ computed by EMSD at the $N_{IT1}$-th iteration is therefore stored and used in the following second number of $N_{IT2}$ iterations. These iterations involve ETCMDs, interleavers and deinterleavers, but not the EMSD.

In the second number of iterations $N_{IT2}$, the $ETCMD_k$ receives as input the soft information $\sigma_{k,j}(t)$ previously computed by EMSD during its last execution, then it executes a trellis-based decoding algorithm (e.g., Viterbi, BCJR or SISO) that applies the TCM's trellis code constraints and computes updated soft information $\omega_{k,j}(t)$ which are discarded. At the same time, the $ETCMD_k$ computes updated soft information of information symbols $\alpha_{k,n}(t)$ which are sent through interleaver $\Pi_k$. These soft information become a-priori information $\beta_{k+K,n}(t)$ as input to the $ETCMD_{k+K}$. When $ETCMD_{k+K}$ is executed, it receives as input the marginal distribution $\sigma_{k+K,j}(t)$ previously computed by the EMSD during its last execution and, from the interleaver $\Pi_k$, the a-priori soft information of information symbols $\beta_{k+K,n}(t)$. The $ETCMD_{k+K}$ computes soft information $\omega_{k+K,j}(t)$ with increased reliability. At the same time, the $ETCMD_{k+K}$ computes updated soft information of information symbols $\alpha_{k+K,n}(t)$ which are sent through the inverse interleaver $\Pi_k^{-1}$; and this soft information becomes a-priori information $\beta_{k,n}(t)$ as input to the $ETCMD_k$.

After the second number of iterations $N_{IT2}$ have been executed, an estimate of the information words $u_k$, for all k in which the current recipient is interested in, is delivered to the recipient.

FIG. 9 shows the present receiver 20 in one embodiment for transmission mode B. Here, the received signal is de-multiplexed in order to separate the signal $r_U$ containing modulation symbols belonging to the upper K transmitter branches from signal $r_V$ containing modulation symbols belonging to the lower K transmitter branches. These two signals $r_U$ and $r_V$ are then sent to two distinct EMSD blocks which perform signal separation. After the signal separation, a bank of ETCMDs performs single-stream decoding.

Otherwise the same principles applied for the receiver 20 for mode A is applied resulting in fewer loops and thus improved performance. Also in this case for mode B, the receiver 20 consists of two phases: the first phase consists of first number of iterations $N_{IT1}$ involving the two EMSDs, the ETCMDs, interleavers and deinterleavers. During even iterations when k is even, or during odd iterations when k is odd, deinterleavers are not executed; the corresponding soft information is not forwarded through them. Similarly, during even iterations when k is odd, or during odd iterations when k is even, interleavers are not executed; the corresponding soft information is not forwarded through them. In this way, the short loops formed by $ETCMD_k$, $\Pi_k$, $ETCMD_{k+K}$, and $\Pi_k^{-1}$ are not present and convergence of the iterative scheme is improved.

After the first number of $N_{IT1}$ iterations have been executed in the mode B receiver, the receiver 20 achieves a separation between streams that cannot be improved by a second number of iterations with the EMSDs. The soft information $\sigma_{k,j}(t)$ computed by the EMSDs at the first number of iterations $N_{IT1}$ is stored and used in the following second number of $N_{IT2}$ iterations. These iterations involve ETCMDs, interleavers and deinterleavers, but not EMSDs.

After the second number of iterations $N_{IT2}$ have been executed in the present receiver 20, an estimate of the information word $u_k$, for all k in which the current recipient is interested, is delivered to the recipient.

In a cellular downlink scenario where one base station transmitter 10 and multiple UEs/recipients are involved, each recipient executes the present receiver algorithm in order to compute estimates of the subsets of information words in which it is interested. Therefore, each recipient selects a subset of the K data streams associated with itself and estimates the information words associated with the selected subset with the deinterleaved updated soft information. Hence, a particular user decodes the whole signal in order to perform efficient stream separation (by the EMSD) which means that all streams are decoded. Thereafter, the user extracts its own stream(s) and discards the other streams. This method is also the same when the different streams are associated with different applications, e.g. in the same receiver device. A certain application extracts its streams and discards the other streams.

FIG. 11 illustrates the downlink scenario in which the transmitter 10 (base station) transmits the present signal in the system 30 and a plurality of receivers 20a, 20b, 20c, . . . , 20n receives the signal and decode it.

In a cellular uplink scenario, a plurality of transmitters 10 (e.g. UEs) simultaneously transmit their signal to a base station receiver 20 which executes the present receiver algorithm to compute estimates of all the information words transmitted by the plurality of transmitters 10.

It should however be noted that the present invention is not limited to cellular systems or uplink/downlink scenarios. Embodiments of the present invention can be implemented in any suitable wireless communication system, such as 3GPP systems or according to other standards.

Performance tests have been performed for the present invention. Transmission on the AWGN channel was assumed. Unless otherwise specified, the number of encoder input bits was b=1 and the TCM constellation was QPSK. Moreover, the TCM trellis encoder was a rate b/e=1/2 recursive systematic convolutional encoder with generator coefficients $(7,5)_8$ when the number of superposed signals was 3 or less and $(3,2)_8$ otherwise.

When the block length is increased, the SE of the conventional solution degrades, while the SE for the present invention further improves. In particular, for L=6144 information bits (the largest block length specified in Long Term Evolution, LTE, Rel.8-12), the conventional solution requires a higher $E_b/N_0$ of approximately 2 dB in order to achieve the same aggregate SE as the present invention.

It was observed that, for a given number of streams K, mode B achieves a lower ASE because it uses twice the REs. However, the aggregate SE of mode B is closer to the AWGN channel capacity, i.e., a lower SNR is required. Here, the present invention scheme achieving ASE=4 bits/s/Hz uses a trellis encoder with b=2 input bits specified by the following matrices:

$$A = \begin{bmatrix} 0 & 1 \\ 1 & 1 \end{bmatrix}; \quad B = \begin{bmatrix} 0 & 1 \\ 1 & 0 \end{bmatrix}; \quad C = \begin{bmatrix} 0 & 0 \\ 1 & 1 \end{bmatrix}; \quad D = \begin{bmatrix} 1 & 0 \\ 0 & 1 \end{bmatrix}. \quad (8)$$

Table 3 shows the single-stream SNR loss computed from the results of simulations using to equation (1). It is observed that the present invention exhibits a higher single-stream SNR loss than the conventional solution. However, at low SNR the single-stream spectral efficiency of the present invention is higher than for the conventional solution (see FIG. 10). The resulting aggregate SE of the present invention is improved.

TABLE 1

Single-stream SNR loss $\Delta_{SNR}(K, 0.9)$ of TTCMA
and ETCMA computed according to equation (1)

| K | TTCMA (Mode A) | TTCMA (Mode B) | ETCMA |
| --- | --- | --- | --- |
| 2 | 1.3 dB | 1.2 dB | 0.25 dB |
| 3 | 2.5 dB | 5.5 dB | 1.55 dB |
| 4 | 5.1 dB | 8.6 dB | 4.3 dB |

Figure 10:
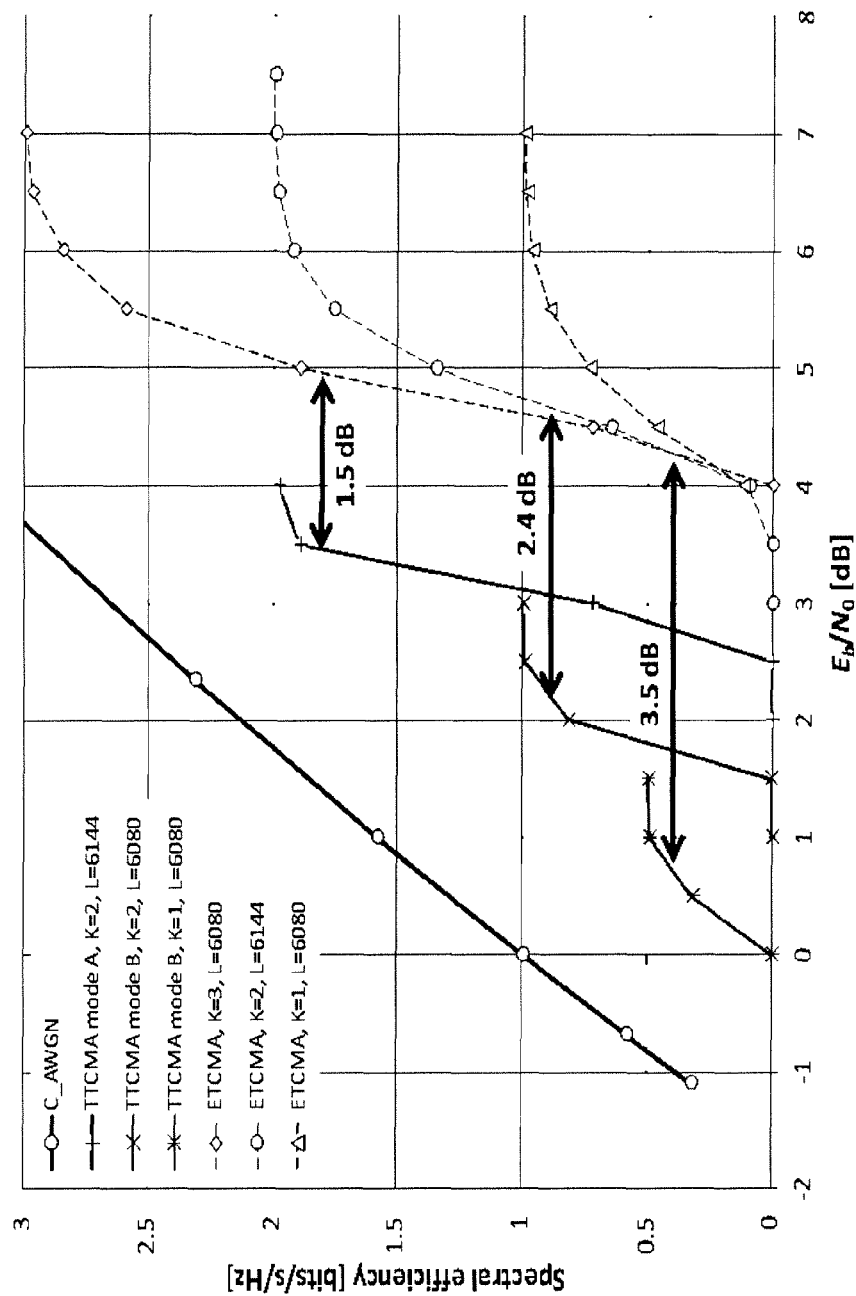
FIG. 10 shows performance results for embodiments of the present invention.

FIG. 10 shows the aggregate SE of the present invention and the conventional solution when long blocks are transmitted. Here solid lines correspond to the present invention and dashed lines to the conventional solution. It is observed that the present invention with larger block length results in an increased aggregate SE.

Embodiments of the present invention can at least be adopted in any wireless communication systems using OFDM and MIMO transmissions, both in the uplink and in the downlink of wireless networks.

Furthermore, any method according to the present invention may be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the present devices, i.e. transmitter device 10 and receiver device 20, comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processors of the present devices may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present invention is not limited to the embodiments described above, but also relates to and incorporates all embodiments within the scope of the appended independent claims.

The invention claimed is:

1. A transmitter device for a wireless communication system, the transmitter device comprising:
  a processor configured to
    receive a set of Z data streams, wherein each data stream comprises a plurality of information words;
    select K data streams from the set of Z data streams for transmission, wherein K≤Z;
    for each information word and for each data stream k=0, ..., K−1:
      encode and modulate an information word $u_k$ of the kth data stream use a Trellis Coded Modulation, TCM, scheme to obtain a first encoded and modulated word $s_k^{(1)}$ for the kth data stream,
      scramble the first encoded and modulated word $s_k^{(1)}$ using a stream specific scrambling sequence $c_k^{(1)}$ to obtain a first scrambled word $q_k^{(1)}$ for the kth data stream; and
      superpose the first scrambled words $q_k^{(1)}$ for all K data streams to obtain a first signal $s_U$;
    further for each information word and for each data stream k=0, ..., K−1:
      interleave the information word $u_k$ of the k-th data stream using a stream specific permutation $\Pi_k$ to obtain an interleaved word $v_k$,
      encode and modulate the interleaved word $v_k$ using a second TCM scheme to obtain a second encoded and modulated word $s_k^{(2)}$ for the kth data stream,
      scramble the second encoded and modulated word $s_k^{(2)}$ for the k-th data stream using a stream specific scrambling sequence $c_k^{(2)}$ to obtain a second scrambled word $c_k^{(2)}$ for the kth data stream; and
      superpose the second scrambled words for all K data streams to obtain a second signal $s_V$;

combine the first signal $s_U$ and the second signal $s_V$ into a signal s for transmission; and a transmitter configured to transmit the signal s over a radio channel of the wireless communication system to at least one user equipment of the wireless communication system.

2. The transmitter device according to claim 1, wherein the processor further is configured to select the K data streams experiencing the same channel quality.

3. The transmitter device according to claim 1, wherein all stream specific permutations $\Pi_k$ for the K data streams are all different from each other.

4. The transmitter device according to claim 3, wherein a stream specific permutation $\Pi_k$ for data stream k=0, ..., K−1 has the property that, for each input pair with indices i,j of neighbouring elements, the permutation spread S fulfils:

$$|i-j|<S \Rightarrow |\Pi_{k,i}-\Pi_{k,j}|\geq S \text{ with } \sqrt{N}/10\leq S\leq\sqrt{N},$$

where |i−j| is the distance between the neighbouring elements i,j; $|\Pi_{k,i}-\Pi_{k,j}|$ is the distance between the neighbouring elements i,j at the output of the stream specific permutation $\Pi_k$; and N is the permutation length.

5. The transmitter device according to claim 3, wherein each stream specific permutation $\Pi_k$ is obtained by circularly shifting the same original permutation $\Pi_C$ but with different numbers of elements for each stream specific permutation.

6. The transmitter device according to claim 1, wherein all stream specific scrambling sequences $c_k^{(1)}$ and $c_k^{(2)}$ for the K data streams have the same amplitude and different phase, or different amplitudes and different phases.

7. The transmitter device according to claim 1, wherein the processor further is configured to combine of the first signal $s_U$ and the second signal $s_V$ to obtain the transmission signal s either by:
  superposing the first signal $s_U$ and the second signal $s_V$; or
  orthogonally multiplexing the first signal $s_U$ and the second signal $s_V$.

8. The transmitter device according to claim 7, wherein the processor further is configured to superposing or orthogonally multiplexing the first signal $s_U$ and the second signal $s_V$ based on channel quality of the radio channel.

9. The transmitter device according to claim 1, wherein all first TCM schemes and all second TCM schemes for the K data streams are the same TCM scheme.

10. A receiver device for a wireless communication system, the receiver device comprising:
  a receiver configured to
    receive a signal r over a radio channel of the wireless communication system transmitted by a transmitter, wherein the signal r includes a transmitted signal s comprising K data streams, wherein each data stream k=0, ..., K−1 comprises an information word, a first modulated word and a second modulated word, wherein the first modulated word and the second modulated word each has L modulated symbols; and
  a processor configured to
    compute a joint probability distribution for all modulation symbols of the K data streams conditioned to the received signal r;
    execute for a first number of iterations it=0, ..., $N_{IT1}$−1 and for each data stream k=0, ..., K−1,
      if k and it both are even, or if k and it both are odd:
        compute first soft information for the L modulation symbols of the first modulated word of the kth data stream,
        decode the first soft information using a trellis-based decoder $ETCMD_k$ to obtain second soft information for the information word of the kth data stream,
        feed the second soft information via a stream specific interleaver $\Pi_k$ to a trellis-based decoder $ETCMD_{k+K}$,
        compute third soft information for the L modulation symbols of the second modulated word of the kth data stream,
        decode the third soft information using the second soft information and the trellis-based decoder $ETCMD_{k+K}$ to obtain updated soft information for the second modulated word of the kth data stream;
        update the joint probability distribution with the updated soft information for the second modulated word of the kth data stream;
      else:
        compute first soft information for the L modulation symbols of the second modulated word of the kth data stream,
        decode the first soft information using a trellis-based decoder $ETCMD_{k+K}$ to obtain second soft information for the information word of the kth data stream,
        feed the second soft information via a stream specific deinterleaver $\Pi_k^{-1}$ to a trellis-based decoder $ETCMD_k$,
        compute third soft information for the L modulation symbols of the first modulated word of the kth data stream,
        decode the third soft information using the second soft information and the trellis-based decoder $ETCMD_k$ to obtain updated soft information for the first modulated word of the kth data stream,
        update the joint probability distribution with the updated soft information for the first modulated word; and
    executing for a second number of iterations it=0, ..., $N_{IT2}$−1 and for each data stream k=0, ..., K−1,
      compute first soft information for the L modulation symbols of the first modulated word of the kth data stream with the updated joint probability distribution,
      decode the first soft information using a trellis-based decoder $ETCMD_k$ to obtain second soft information for the information word of the kth data stream,
      feed the second soft information via a stream specific interleaver $\Pi_k$ to a trellis-based decoder $ETCMD_{k+K}$,
      compute third soft information for the L modulation symbols of the second modulation word of the kth data stream with the updated joint probability distribution,
      decode the third soft information using the second soft information and the trellis-based decoder $ETCMD_{k+K}$ to obtain updated soft information for the information word of the kth data stream;
      feed the updated soft information via a stream specific deinterleaver $\Pi_k^{-1}$ to the trellis-based decoder $ETCMD_k$ to obtain deinterleaved updated soft information,
      estimate the information word of the kth data stream with the deinterleaved updated soft information.

11. The receiver device according to claim 10, wherein the processor is further configured to
  select a subset of the K data streams;
  estimate the information words associated with the selected subset with the deinterleaved updated soft information.

12. A method in a transmitter device for a wireless communication system, the method comprising:

by a processor:
receiving a set of Z data streams, wherein each data stream comprises a plurality of information words;
selecting K data streams from the set of Z data streams for transmission, wherein K≤Z;
for each information word and for each data stream k=0, . . . , K−1:
encoding and modulating an information word $u_k$ of the kth data stream using a Trellis Coded Modulation, TCM, scheme to obtain a first encoded and modulated word $s_k^{(1)}$ for the kth data stream,
scrambling the first encoded and modulated word $s_k^{(1)}$ using a stream specific scrambling sequence $c_k^{(1)}$ to obtain a first scrambled word $q_k^{(1)}$ for the kth data stream; and
superposing the first scrambled words $q_k^{(1)}$ for all K data streams to obtain a first signal $s_U$;
further for each information word and for each data stream k=0, . . . , K−1:
interleaving the information word $u_k$ of the k-th data stream using a stream specific permutation $\Pi_k$ to obtain an interleaved word $v_k$,
encoding and modulating the interleaved word $v_k$ using a second TCM scheme to obtain a second encoded and modulated word $s_k^{(2)}$ for the kth data stream,
scrambling the second encoded and modulated word $s_k^{(2)}$ for the k-th data stream using a stream specific scrambling sequence $c_k^{(2)}$ to obtain a second scrambled word $q_k^{(2)}$ for the kth data stream; and
superposing the second scrambled words for all K data streams to obtain a second signal $s_V$;
combining the first signal $s_U$ and the second signal $s_V$ into a signal s for transmission; and
by a transmitter
transmitting the signal s over a radio channel of the wireless communication system to at least one user equipment of the wireless communication system.

13. A method in a receiver device for a wireless communication system, the method comprising:

by a receiver:
receiving a signal r transmitted by a transmitter over a radio channel of the wireless communication system, wherein the signal r includes a transmitted signal s comprising K data streams, wherein each data stream k=0, . . . , K−1 comprises an information word, a first modulated word and a second modulated word, wherein the first modulated word and the second modulated word each has L modulated symbols;
by a processor:
computing a joint probability distribution for all modulation symbols of the K data streams conditioned to the received signal r;
executing for a first number of iterations it=0, . . . , $N_{IT1}$−1 and for each data stream k=0, . . . , K−1,
if k and it both are even, or if k and it both are odd:
computing first soft information for the L modulation symbols of the first modulated word of the kth data stream,
decoding the first soft information using a trellis-based decoder $ETCMD_k$ to obtain second soft information for the information word of the kth data stream,
feeding the second soft information via a stream specific interleaver $\Pi_k$ to a trellis-based decoder $ETCMD_{k+K}$,
computing third soft information for the L modulation symbols of the second modulated word of the kth data stream,
decoding the third soft information using the second soft information and the trellis-based decoder $ETCMD_{k+K}$ to obtain updated soft information for the second modulated word of the kth data stream;
updating the joint probability distribution with the updated soft information for the second modulated word of the kth data stream;
else:
computing first soft information for the L modulation symbols of the second modulated word of the kth data stream,
decoding the first soft information using a trellis-based decoder $ETCMD_{k+K}$ to obtain second soft information for the information word of the kth data stream,
feeding the second soft information via a stream specific deinterleaver $\Pi_k^{-1}$ to a trellis-based decoder $ETCMD_k$,
computing third soft information for the L modulation symbols of the first modulated word of the kth data stream,
decoding the third soft information using the second soft information and the trellis-based decoder $ETCMD_k$ to obtain updated soft information for the first modulated word of the kth data stream,
updating the joint probability distribution with the updated soft information for the first modulated word; and
executing for a second number of iterations it=0, . . . , $N_{IT2}$−1 and for each data stream k=0, . . . , K−1,
computing first soft information for the L modulation symbols of the first modulated word of the kth data stream with the updated joint probability distribution,
decoding the first soft information using a trellis-based decoder $ETCMD_k$ to obtain second soft information for the information word of the kth data stream,
feeding the second soft information via a stream specific interleaver $\Pi_k$ to a trellis-based decoder $ETCMD_{k+K}$,
computing third soft information for the L modulation symbols of the second modulation word of the kth data stream with the updated joint probability distribution,
decoding the third soft information using the second soft information and the trellis-based decoder $ETCMD_{k+K}$ to obtain updated soft information for the information word of the kth data stream;
feeding the updated soft information via a stream specific deinterleaver $\Pi_k^{-1}$ to the trellis-based decoder $ETCMD_k$ to obtain deinterleaved updated soft information,
estimating the information word of the kth data stream with the deinterleaved updated soft information.

* * * * *